(12) United States Patent
Giannakopoulos

(10) Patent No.: US 9,410,427 B2
(45) Date of Patent: Aug. 9, 2016

(54) COMPRESSOR POWER AND TORQUE TRANSMITTING HUB

(75) Inventor: Konstantinos Panagiotis Giannakopoulos, Middletown, CT (US)

(73) Assignee: United Technologies Corporation, Hartford, CT (US)

(*) Notice: Subject to any disclaimer, the term of this patent is extended or adjusted under 35 U.S.C. 154(b) by 949 days.

(21) Appl. No.: 13/489,168

(22) Filed: Jun. 5, 2012

(65) Prior Publication Data
US 2013/0323077 A1 Dec. 5, 2013

(51) Int. Cl.
*F01D 5/02* (2006.01)
*F04D 29/054* (2006.01)
*F04D 29/32* (2006.01)

(52) U.S. Cl.
CPC .............. *F01D 5/025* (2013.01); *F01D 5/026* (2013.01); *F04D 29/321* (2013.01); *F05D 2260/403* (2013.01); *Y02T 50/671* (2013.01)

(58) Field of Classification Search
CPC ........................................... F01D 9/042
See application file for complete search history.

(56) References Cited

U.S. PATENT DOCUMENTS

| | | | | |
|---|---|---|---|---|
| 4,502,274 A | * | 3/1985 | Girault | F01D 25/18 184/6.11 |
| 5,307,622 A | | 5/1994 | Ciokajlo et al. | |
| 5,433,674 A | | 7/1995 | Sheridan et al. | |
| 5,813,214 A | * | 9/1998 | Moniz | F01D 25/18 415/175 |
| 6,223,616 B1 | | 5/2001 | Sheridan | |
| 6,464,401 B1 | * | 10/2002 | Allard | F16C 19/364 384/561 |
| 6,619,030 B1 | | 9/2003 | Seda et al. | |
| 6,739,120 B2 | * | 5/2004 | Moniz | F01D 5/022 60/226.1 |
| 7,296,398 B2 | * | 11/2007 | Moniz | F01D 1/26 60/226.1 |
| 7,458,202 B2 | * | 12/2008 | Moniz | F01D 25/18 60/226.1 |
| 7,591,754 B2 | | 9/2009 | Duong et al. | |
| 7,824,305 B2 | | 11/2010 | Duong et al. | |
| 7,849,668 B2 | | 12/2010 | Sheridan | |
| 7,926,260 B2 | | 4/2011 | Sheridan et al. | |
| 8,205,432 B2 | | 6/2012 | Sheridan | |
| 8,727,719 B2 | * | 5/2014 | Belmonte et al. | 415/209.2 |
| 2003/0163984 A1 | * | 9/2003 | Seda | F01D 9/041 60/226.1 |
| 2005/0106009 A1 | | 5/2005 | Cummings et al. | |
| 2008/0075590 A1 | * | 3/2008 | Moniz | F01D 5/066 415/229 |
| 2009/0090096 A1 | | 4/2009 | Sheridan | |

(Continued)

FOREIGN PATENT DOCUMENTS

EP 0747573 B1 8/2003
EP 1921253 A2 5/2008

(Continued)

OTHER PUBLICATIONS

Internation Search Report, Sep. 4, 2013, PCT/US2013/043878.

(Continued)

*Primary Examiner* — Eric Keasel
*Assistant Examiner* — Brian O Peters
(74) *Attorney, Agent, or Firm* — Kinney & Lange, P.A.

(57) ABSTRACT

A compressor hub includes a sleeve portion, a cone portion, and a mounting flange portion. The sleeve portion is cylindrical about a sleeve axis. The frustoconical cone portion is attached to the sleeve portion and diverges radially outward. In addition, the cone portion includes an inner cone portion with an inner generatrix and an outer cone portion with an outer generatrix that is colinear with the inner generatrix. The mounting flange portion is attached to the outer cone for attaching a rotor disk to the compressor hub.

20 Claims, 5 Drawing Sheets

(56) References Cited

U.S. PATENT DOCUMENTS

| | | |
|---|---|---|
| 2012/0195753 A1 | 8/2012 | Davis et al. |
| 2012/0251306 A1 | 10/2012 | Reinhardt et al. |
| 2012/0260623 A1* | 10/2012 | McCune et al. ............ 60/226.1 |
| 2012/0263578 A1 | 10/2012 | Davis et al. |

FOREIGN PATENT DOCUMENTS

| | | |
|---|---|---|
| EP | 2365184 A2 | 9/2011 |
| EP | 2511500 A2 | 10/2012 |
| WO | 2013138023 A1 | 9/2013 |

OTHER PUBLICATIONS

T. A. Dickey et al., "The Evolution and Development Status of the ALF 502 Turbofan Engine", Society of Automotive Engineers, Inc.; National Aerospace Engineering and Mfg. Meeting, Oct. 2-5, 1972, 15 pages.

M. Cusick, "Avco Lycoming's ALF 502 High Bypass Fan Engine", Society of Automotive Engineers, Inc.; Business Aircraft Meeting & Exposition, Apr. 7-10, 1981, 13 pages.

K. R. Fledderjon, The TFR731-5: Evolution of a Decade of Business Jet Service; Business Aircraft Meeting & Exposition, Apr. 12-15, 1983; 17 pages.

IHS Jane's, Jane's Aero-Engines, "Aviadvigatel D-110" (Russian Federation) Jun. 1, 2010, 4 pages.

IHS Jane's, Jane's Aero-Engines, "Turbomeca Aubisque" (France) Nov. 2, 2009, 4 pages.

IHS Jane's, Jane's Aero-Engines, "Rolls-Royce M45H" (United Kingdom) Feb. 24, 2010, 4 pages.

IHS Jane's, Jane's Aero-Engines, "Ivchenko-Progress D-436" (Ukraine) Feb. 8, 2012, 11 pages.

IHS Jane's, Jane's Aero-Engines, "Honeywell LF507" (United States) Feb. 9, 2012, 4 pages.

IHS Jane's, Jane's Aero-Engines, "Honewell TFE731" (United States) Jul. 18, 2012, 15 pages.

NASA Conference Publication 2077, "Quiet, Powered-Lift Propulsion", Conference held on Nov. 14-15, 1978, pp. 79-81.

Collections of materials relating to TFE731-LF507 engines.

IHS Jane's, Jane's Aero-Engines, "Honeywell LF502" (United States) Feb. 9, 2012, 6 pages.

Supplementary European Search Report dated Jan. 14, 2016, for corresponding European Application No. 13799776.

* cited by examiner

COMPRESSOR POWER AND TORQUE TRANSMITTING HUB

BACKGROUND

This invention relates generally to gas turbine engines, and specifically to the fan drive gear system of a turbofan engine.

Gas turbine engines provide efficient, reliable power sources for a wide range of aviation applications. In the particular area of fixed-wing aircraft, engine design has evolved substantially from the original turbojet concept to include a wide range of highly efficient and responsive turbofan designs.

Turbofan engines are built around an engine core formed by a compressor, a combustor and a turbine, which are arranged in flow series between an upstream inlet and a downstream exhaust. The turbine core may be coupled to a fan drive gear system that is connected to a fan, which accelerates flow from the inlet through a bypass duct arranged around the core. The core airflow is directed through the compressor, where it is compressed and then mixed with fuel in the combustor. The compressed air-fuel mixture is ignited to produce hot combustion gas, which drives the turbine and is exhausted downstream.

In two-spool turbofan engines, the turbine is divided into a high pressure turbine (HPT) section and a low pressure turbine (LPT) section. The HPT section is coupled to the high pressure compressor (HPC) section via a high pressure (HP) shaft, forming the high pressure spool, and the LPT section is coupled to the low pressure compressor (HPC) section and the fan via a low pressure (LP) shaft, forming the low pressure spool. The HPT, LPT, HPC, and LPC sections are each further divided into a number of stages, or alternating rows of blades and vanes. Individual blades and vanes are shaped as airfoils, and are configured to perform a number of functions including accelerating and turning the working fluid flow, compressing air in the compressor, and extracting energy from expanding combustion gas in the turbine.

The HPT and LPT spools are usually coaxially mounted, and rotate independently. The geared fan drive is used to provide independent control of the LPT/fan speed ratio, in order to increase engine efficiency, reduce noise, and improve turbofan performance. However, these advantages come at the cost of increased complexity required to connect the LPT to the fan drive gear system, which is a task that is complicated by the numerous components and systems that are tightly arranged within the engine.

SUMMARY

According to the present invention, a compressor hub includes a sleeve portion, a cone portion, and a mounting flange portion. The sleeve portion is cylindrical about a sleeve axis. The frustoconical cone portion is attached to the sleeve portion and diverges radially outward. In addition, the cone portion includes an inner cone portion with an inner generatrix and an outer cone portion with an outer generatrix that is colinear with the inner generatrix. The mounting flange portion is attached to the outer cone for attaching a rotor disk to the compressor hub.

In another embodiment, a compressor hub includes a sleeve portion, a cone portion, and a mounting flange portion. The sleeve portion is cylindrical about a sleeve axis and includes an inner spline on an inner sleeve surface and an outer spline on an outer sleeve surface. The frustoconical cone portion is attached to the sleeve portion and diverges radially outward. The mounting flange portion is attached to the outer cone for attaching a rotor disk to the compressor hub.

In another embodiment, a compressor includes single piece compressor hub having a sleeve portion, a cone portion, a mounting flange portion. The sleeve portion is cylindrical about a sleeve axis. The frustoconical cone portion extends from the sleeve portion and diverges radially outward. The mounting flange portion is adjacent to an outer end of the cone portion. In addition, there are two rotor disks attached to the mounting flange.

DETAILED DESCRIPTION

Figure 1:
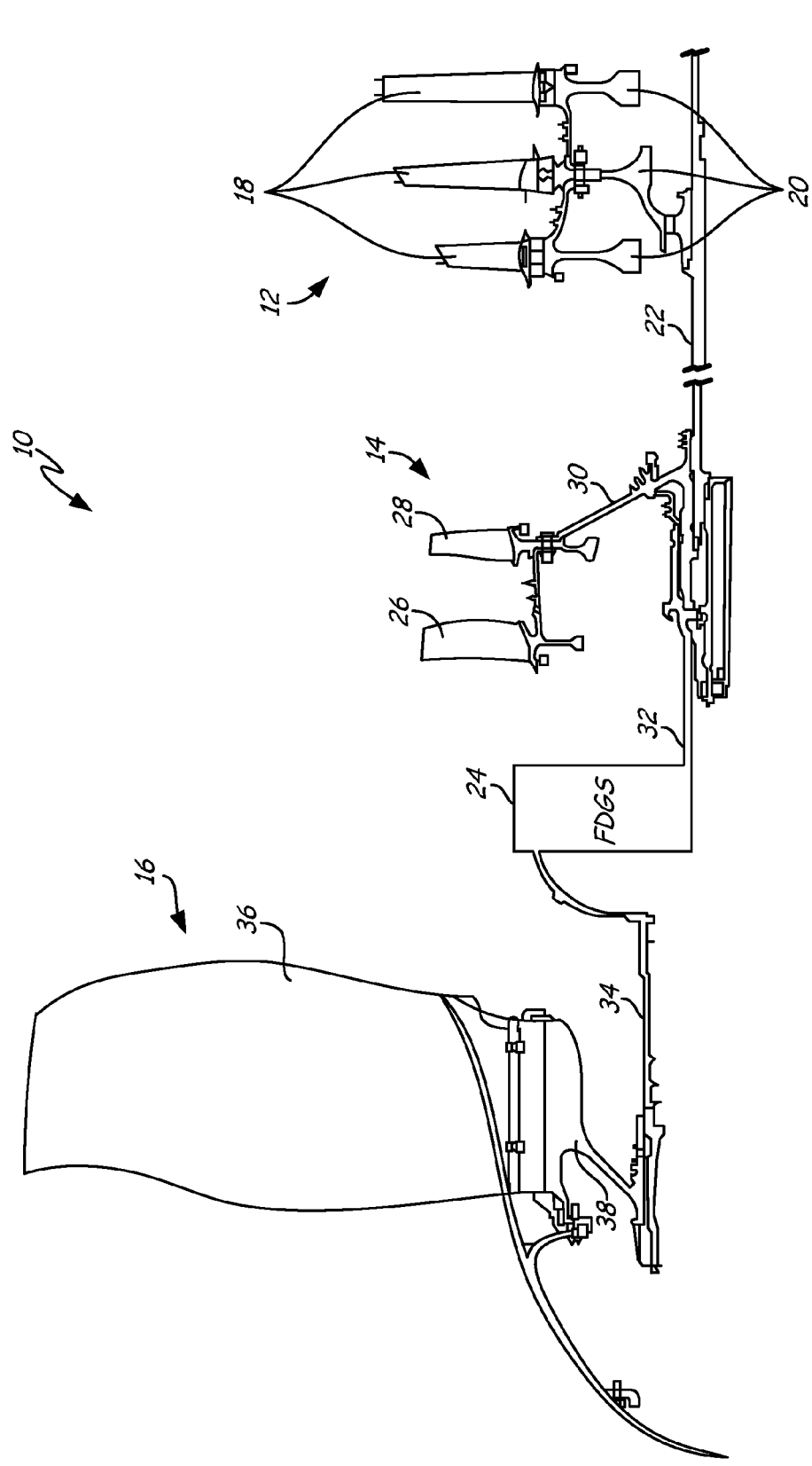
FIG. 1 is a partial cross-sectional view of a low pressure spool including a low pressure compressor section.

FIG. 1 is a partial cross-sectional view of low pressure spool 10 including low pressure compressor 14. Although a gas turbine engine includes many more components than are shown in FIG. 1, any absent parts have been removed for the sake of clarity. Low pressure spool 10 comprises low pressure turbine (LPT) 12, low pressure compressor (LPC) 14, and fan assembly 16. LPT 12 comprises a plurality of turbine blades 18 attached to turbine rotors 20. Turbine rotors 20 are attached to low pressure (LP) shaft 22, which is rotationally coupled to LPC 14 and fan drive gear system (FDGS) 24.

LPC 14 comprises first integrally bladed rotor (IBR) 26 and second IBR 28, both of which are mounted to compressor hub 30. Although LPC 14 also includes a plurality of stator stages attached to an engine case, these components have been removed for the sake of clarity. IBRs 26, 28 are each single piece components that include a plurality of blades and a disk. As stated previously, compressor hub 30 is rotationally coupled to LP shaft 22, and compressor hub 30 is also rotationally coupled to fan gear drive shaft 32. Fan gear drive shaft 32 is the input shaft for FDGS 24, and in the illustrated embodiment, FDGS 24 includes a planetary gear set that can change the direction and/or ratio of rotation between the input (fan gear drive shaft 32) and the output (which is fan drive shaft 34). In addition, at least LP shaft 22, compressor hub 30, and fan drive shaft 34 are rotatably positioned coaxially about engine centerline $C_L$.

Fan assembly 16 comprises a plurality of fan blades 36 attached to fan hub 38. Fan hub 38 is rotationally connected to fan drive shaft 34. Thereby, when LPT 12 rotates due to expanding gasses during operation of the gas turbine engine, LP shaft 22, LPC 14, and fan assembly 16 all rotate (although fan assembly 16 may rotate at a different rate and/or direction from the other rotating components). Because FDGS 24 includes a gear set, fan assembly 16 rotates at a speed that is proportional to but not necessarily the same as LP shaft 22. This provides for additional fan speed control, which improves thrust performance and efficiency while reducing noise output.

Figure 2:
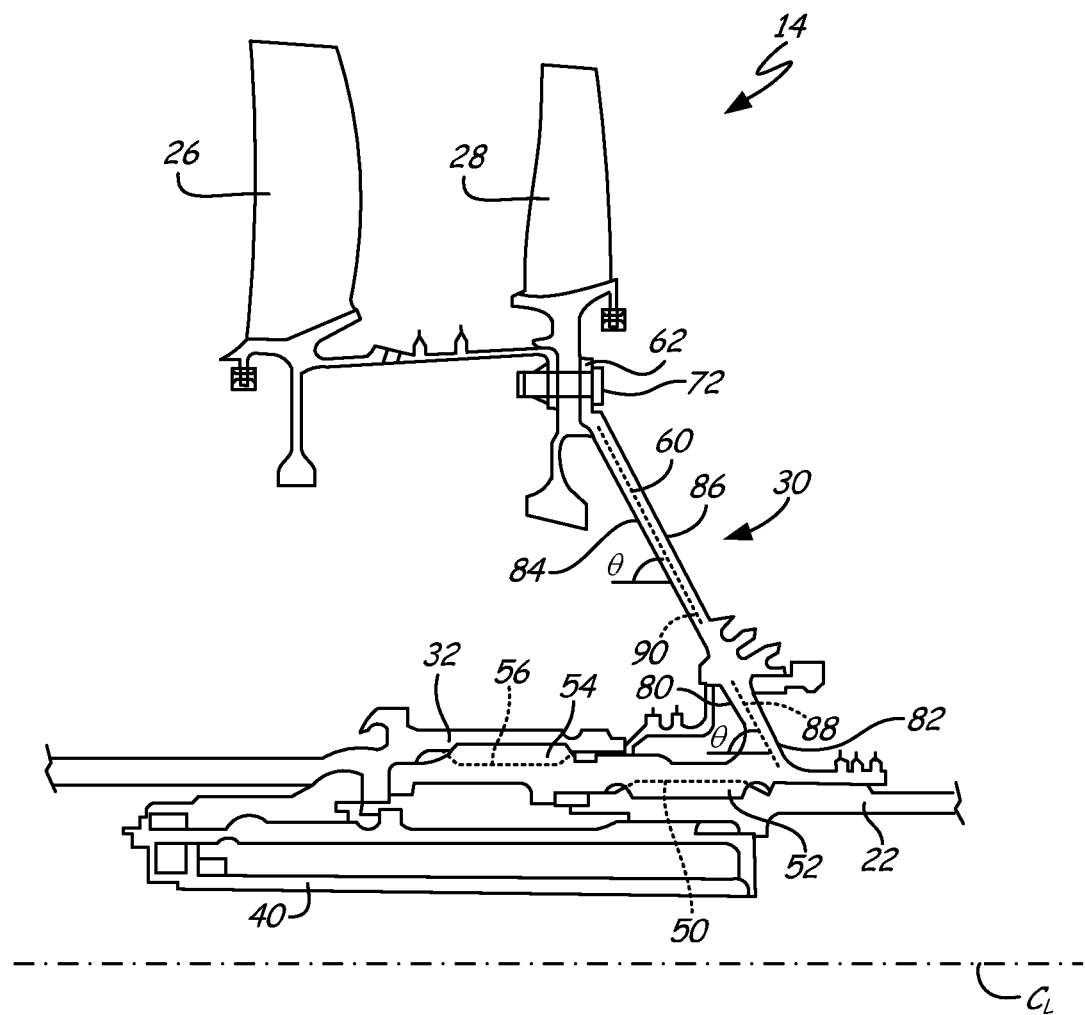
FIG. 2 is a partial cross-sectional view of the low pressure compressor section including a compressor hub.

FIG. 2 is a partial cross-sectional view of low pressure compressor (LPC) 14 including compressor hub 30, which is rotationally connected to both low pressure (LP) shaft 22 and fan gear drive shaft 32. This connection is made by LP shaft 22 overlapping compressor hub 30 such that shaft spline 50 of LP shaft 22 interfaces with inner spline 52 on compressor hub 30, and by compressor hub 30 overlapping fan gear drive shaft 32 such that outer spline 54 of compressor hub 30 interfaces with drive spline 56 on fan gear drive shaft 32. In addition, LP shaft 22, compressor hub 30, and fan gear drive shaft 32 are axially constrained by tie shaft 40. In the illustrated embodiment, tie shaft 40 is a bolt that rotates with LP shaft 22, compressor hub 30, and fan gear drive shaft 32, although tie shaft 40 prevents LP shaft 22 and fan gear drive shaft 32 from separating from compressor hub 30.

In general, compressor hub 30 further includes sleeve portion 58 (upon which splines 52, 54 reside), cone portion 60, and mounting flange portion 62. In the illustrated embodiment, sleeve portion 58 is cylindrical about sleeve axis 64 (shown in FIG. 3A), which is coaxial with engine centerline $C_L$. Cone portion 60 is attached to sleeve portion 58 and diverges radially outward and forward at cone angle θ from sleeve portion 58. Cone portion 60 has a frustoconical shape, and mounting flange portion 62 extends radially outward from the outermost region of cone portion 60. More specifically, mounting flange portion 62 extends substantially perpendicular to engine centerline $C_L$. While compressor hub 30 is generally comprised of three portions, in most embodiments compressor hub is a single piece component.

Cone portion 60 comprises inner cone portion 76 and outer cone portion 78. Inner cone portion 76 diverges from sleeve portion 58 to outer cone portion 78, which extends to mounting flange portion 62. In general, inner cone portion 76 and outer cone portion 78 extend at substantially the same cone angle θ which is, in the illustrated embodiment, sixty degrees from sleeve axis 64 (shown in FIG. 3A and coaxial with engine centerline $C_L$). Additionally, inner cone portion 76 and outer cone portion 78 are tangent to one another and form a straight frustoconical shape. More specifically, inner cone portion 76 has forward inner cone surface 80 and aftward inner cone surface 82, both of which are bisected by inner generatrix 88 such that inner generatrix 88 is equidistant from forward inner cone surface 80 and aftward inner cone surface 82. Similarly, outer cone portion 78 has forward outer cone surface 84 and aftward outer cone surface 86, both of which are bisected by outer generatrix 90 such that outer generatrix 90 is equidistant from forward outer cone surface 84 and aftward outer cone surface 86. Inner cone portion 76 and outer cone portion 78 are tangent to one another and form a straight frustoconical shape because inner generatrix 88 is colinear with outer generatrix 90.

In the illustrated embodiment, inner cone portion 76 is thicker than outer cone portion 78. This is shown by forward inner cone surface 80 being a distance apart from aftward inner cone surface 82 that is greater than the distance between forward outer cone surface 84 and aftward outer cone surface 86. Although, as stated previously, cone portion 60 extends straight between sleeve portion 58 and mounting flange portion 62 because inner generatrix 88 is colinear with outer generatrix 90.

Connected to mounting flange portion 62 are first integrally bladed rotor (IBR) 26 and second IBR 28. In the illustrated embodiment, IBRs 26, 28 are attached to mounting flange portion 62 by a plurality of bolts 72 that pass through a plurality of mounting holes 74, respectively (although only one pair of bolt 72 and mounting hole 74 is visible in FIG. 2).

First IBR 26 extends forward from mounting flange portion 62 while second IBR 28 is immediately proximate to mounting flange portion 62.

During operation of low pressure spool 10 (shown in FIG. 1), low pressure turbine 12 (shown in FIG. 1) will generate torque and low pressure (LP) shaft 22 will rotate. The spline connection between LP shaft 22 and compressor hub 30 causes compressor hub 30 to rotate with LP shaft 22. In addition, the spline connection between compressor hub 30 and fan gear drive shaft 32 causes fan gear drive shaft 32 to rotate with compressor hub 30 and LP shaft 22. Although fan gear drive shaft 32 rotates, fan assembly 16 (shown in FIG. 1) will not necessarily rotate at the same speed or in the same direction due to fan drive gear system 24 (also shown in FIG. 1). In addition, because IBRs 26, 28 are attached to mounting flange portion 62, IBRs 26, 28 will rotate with compressor hub 30 and low pressure shaft 22.

The components, configuration, and assembly of LPC 14 as shown in FIG. 2 allow for the transmission of torque from low pressure shaft 38 to IBRs 26, 28 as well as to fan gear drive shaft 32. Furthermore, the single-piece construction of compressor hub 30 and the colinear arrangement of inner cone portion 76 and outer cone portion 78 increases stiffness while minimizing weight.

Figure 3A:
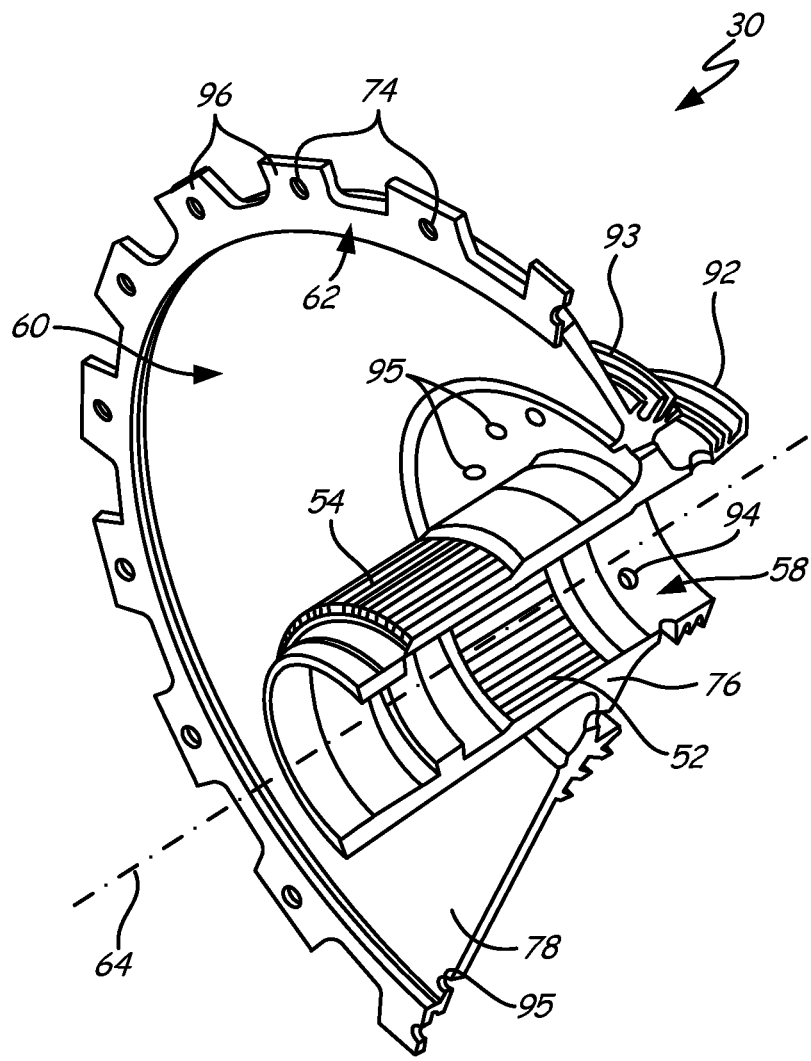
FIG. 3A is a perspective cut-away view of the compressor hub.
Figure 3B:
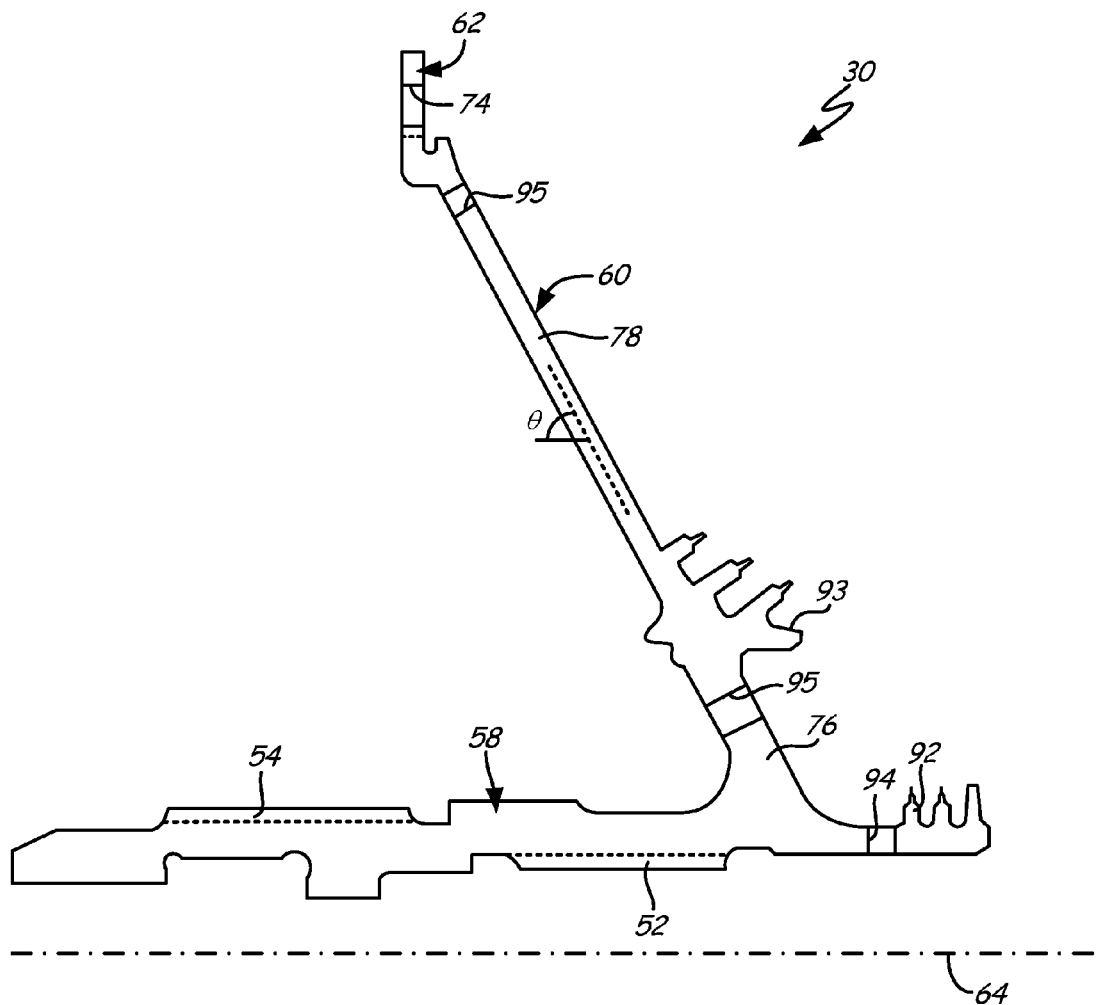
FIG. 3B is a partial cross-sectional view of the compressor hub.

FIG. 3A is a perspective cut away view of compressor hub 30. FIG. 3B is a partial cross-sectional view of compressor hub 30. FIGS. 3A-3B will now be discussed simultaneously.

Compressor hub 30 is as previously described in FIGS. 1-2, so compressor hub 30 generally comprises sleeve portion 58, cone portion 60, and mounting flange portion 62. In the illustrated embodiment, sleeve portion 58 is generally cylindrical about sleeve axis 64. Near the forward end and on the outer surface of sleeve portion 58 is outer spline 54. Aft of outer spline 54 and on the inner surface of sleeve portion 58 is inner spline 52. At the aftward end and outward side of sleeve portion 58 is sleeve seal portion 92. Sleeve seal portion 92 wraps around substantially the entire circumference of sleeve portion 58. Sleeve seal portion 92 is a series of knife edge seals that interface with other components inside of LPC 14 (as shown in FIG. 2). Cone portion 60 diverges from sleeve portion 58 between inner spline 52 and seal portion 92, near the aftward end of sleeve portion 58. In between cone portion 60 and sleeve seal portion 92 is a plurality of sleeve flow apertures 94 through sleeve portion 58.

As stated previously, sleeve portion 58 includes inner spline 52 and outer spline 54. In the illustrated embodiment, inner spline 52 is spaced apart from outer spline 54 along sleeve axis 64. Thereby, inner spline 52 does not overlap with outer spline 54. This creates a stronger arrangement such that if there was a seizure of fan assembly 16, LPC 14, and/or LPT 12 (all shown in FIG. 1), inner spline 52 and/or outer spline 54 would shear off, leaving the majority of compressor hub 30 intact.

In the illustrated embodiment, inner cone portion 76 of cone portion 60 diverges from sleeve portion 58 at cone angle θ. Inner cone portion 76 is adjacent to the thinner outer cone portion 78. Both inner cone portion 76 and outer cone portion 78 include a plurality of cone flow apertures 95 through cone portion 60. At the intersection of inner cone portion 76 and outer cone portion 78, on the aftward side of cone portion 76, is cone seal portion 93. Cone seal portion 93 wraps around substantially the entire circumference of sleeve portion 58. Cone seal portion 93 is a series of knife edge seals that interface with other components inside of LPC 14 (as shown in FIG. 2).

Mounting flange portion 62 is adjacent to the outermost edge of outer cone portion 78 and extends radially therefrom.

Mounting flange includes a plurality of tabs 96. Each tab 96 is circumferentially spaced apart from the adjacent tabs 96, and each tab 96 includes a mounting hole 74.

The components and configuration of compressor hub 30 as shown in FIGS. 3A-3B allow for the combination of seal portions 92 and flow apertures 94 to control gas flow through the interior of low pressure compressor 14 (shown in FIG. 2). In addition, due to mounting flange portion 62, all rotor disks 26, 28 can be mounted at the same location. When this is done, the stress on each mounting hole 74 is distributed throughout each respective tab 96 because of the gaps between tabs 96.

Figure 4:
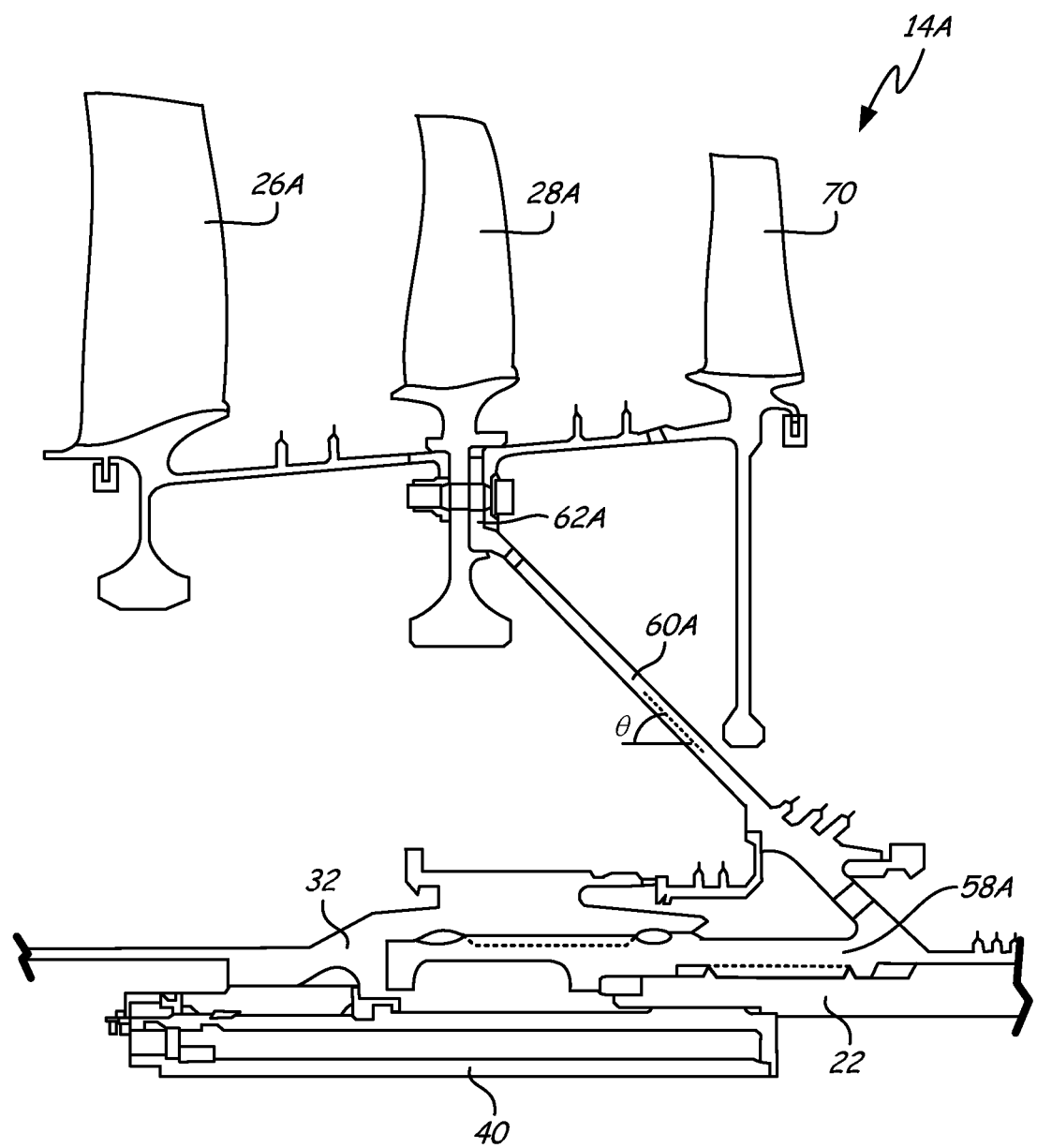
FIG. 4 is a partial cross-sectional view of an alternate embodiment of a low pressure compressor section including an alternate embodiment of a compressor hub.

FIG. 4 is a partial cross-sectional view of alternate embodiment low pressure compressor (LPC) 14A including alternate embodiment compressor hub 30A. In the illustrated embodiment, cone section 60A diverges from sleeve portion 58A at cone angle θ which is forty-seven degrees from sleeve axis.

LPC 14A includes third rotor disk 70 in addition to first rotor disk 26A and second rotor disk 28A, and all rotor disks 26A, 28A, 70 are connected to mounting flange portion 62A. First IBR 26A extends forward from mounting flange portion 62A, second IBR 28A is immediately proximate to mounting flange portion 62A, and third rotor disk 70 extends aftward from mounting flange portion 62A, such that mounting flange portion 62A is generally in the center of the set of IBRs 26A, 28A, 70. The attachment of mounting flange portion 62A near the middle of the array of disks 26A, 28A, 70 prevents disks 26A, 28A, 70 from wobbling during operation.

It should be recognized that the present invention provides numerous benefits and advantages. For example, the number of parts in low pressure compressor 14 is minimized while maintaining stiffness and light weight with respect to compressor hub 30. In addition, air surrounding low pressure spool 10 is allowed to travel through compressor hub 30 in specified pathways but is substantially sealed from escaping these pathways.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A compressor hub according to an exemplary embodiment of this disclosure, among other possible things, includes a sleeve portion that is cylindrical about a sleeve axis; a frustoconical cone portion attached to the sleeve portion that diverges forward and radially outward, the cone portion comprising an inner cone portion adjacent to the sleeve portion, the inner cone portion having a frustoconical shape including a forward inner cone surface opposing an aftward inner cone surface that are bisected by an inner generatrix that is equidistant from the forward inner cone surface and the aftward inner cone surface; and an outer cone portion adjacent to the inner cone portion, the outer cone portion having a frustoconical shape including a forward outer cone surface opposing an aftward outer cone surface that are bisected by an outer generatrix that is equidistant from the forward outer cone surface and the aftward outer cone surface, wherein the inner generatrix and the outer generatrix are colinear; and a mounting flange portion attached to the outer cone for attaching a rotor disk to the compressor hub.

A further embodiment of the foregoing compressor hub, wherein the compressor hub can be a single component.

A further embodiment of any of the foregoing compressor hubs, wherein the sleeve portion can include an inner sleeve surface opposing an outer sleeve surface, the inner sleeve surface having an inner spline and the outer sleeve surface having an outer spline.

A further embodiment of any of the foregoing compressor hubs, wherein the cone portion can diverge from the sleeve portion at an acute cone angle.

A further embodiment of any of the foregoing compressor hubs, wherein a seal portion can be attached to at least one of the cone portion and the sleeve portion.

A further embodiment of any of the foregoing compressor hubs, wherein a plurality of flow apertures can extend through at least one of the cone portion and the sleeve portion.

A further embodiment of any of the foregoing compressor hubs, wherein a first distance between the forward inner cone surface and the aftward inner cone surface can be greater than a second distance between the forward outer cone surface and the aftward outer cone surface.

A compressor hub according to an exemplary embodiment of this disclosure, among other possible things, includes a sleeve portion that is cylindrical about a sleeve axis, the sleeve including an inner sleeve surface opposing an outer sleeve surface, the inner sleeve surface having an inner spline and the outer sleeve surface having an outer spline; a frustoconical cone portion attached to the sleeve that diverges forward and radially outward; and a mounting flange attached to an outer end of the cone portion for attaching a rotor disk to the compressor hub.

A further embodiment of the foregoing compressor hub, wherein the compressor hub can be a single component.

A further embodiment of any of the foregoing compressor hubs, wherein the cone portion can diverge from the sleeve portion at an acute cone angle.

A further embodiment of any of the foregoing compressor hubs, wherein a seal portion can be attached to at least one of the cone portion and the sleeve portion.

A further embodiment of any of the foregoing compressor hubs, wherein a plurality of flow apertures can extend through at least one of the cone portion and the sleeve portion.

A further embodiment of any of the foregoing compressor hubs, wherein the inner spline and the outer spline can be spaced apart from each other along the sleeve axis such that the inner spline does not overlap the outer spline.

A further embodiment of any of the foregoing compressor hubs, wherein the inner spline can be aftward of the outer spline.

A further embodiment of any of the foregoing compressor hubs, wherein the cone portion can be attached to the sleeve portion near the aftward end of the sleeve portion.

A compressor according to an exemplary embodiment of this disclosure, among other possible things, includes a single piece compressor hub including a sleeve portion that is cylindrical about a sleeve axis; and a frustoconical cone portion extending from the sleeve portion that diverges forward and radially outward; and a mounting flange portion adjacent to an outer end of the cone portion; a first rotor disk attached to the mounting flange; and a second rotor disk attached to the mounting flange.

A further embodiment of the foregoing compressor, wherein a third rotor disk can be attached to the mounting flange.

A further embodiment of any of the foregoing compressors, wherein the mounting flange portion can be comprised of a plurality of circumferentially separated tabs that each includes a mounting hole for attaching at least one of the rotor disks.

A further embodiment of any of the foregoing compressors, wherein the sleeve portion of the hub can include an inner sleeve surface opposing an outer sleeve surface, the inner sleeve surface having an inner spline and the outer sleeve surface having an outer spline.

A further embodiment of any of the foregoing compressors, wherein the cone portion of the compressor hub can comprise an inner cone portion adjacent to the sleeve portion, the inner cone portion having a frustoconical shape including a forward inner cone surface opposing an aftward inner cone surface that are bisected by an inner generatrix that is equidistant from the forward inner cone surface and the aftward inner cone surface; and an outer cone portion adjacent to the inner cone portion, the outer cone portion having a frustoconical shape including a forward outer cone surface opposing an aftward outer cone surface that are bisected by an outer generatrix that is equidistant from the forward outer cone surface and the aftward outer cone surface; wherein the inner generatrix and the outer generatrix are colinear.

A further embodiment of any of the foregoing compressors, wherein the sleeve portion of the hub can include an inner sleeve surface opposing an outer sleeve surface, the inner sleeve surface having an inner spline and the outer sleeve surface having an outer spline.

A further embodiment of any of the foregoing compressors, wherein a plurality of flow apertures can extend through at least one of the cone portion and the sleeve portion.

The invention claimed is:

1. A compressor hub comprising:
   a sleeve portion that is cylindrical about a sleeve axis;
      wherein the sleeve portion includes an inner sleeve surface opposing an outer sleeve surface, the inner sleeve surface having an inner spline and the outer sleeve surface having an outer spline
   a frustoconical cone portion attached to the sleeve portion that diverges forward and radially outward, the cone portion comprising:
      an inner cone portion adjacent to the sleeve portion, the inner cone portion having a frustoconical shape including a forward inner cone surface opposing an aftward inner cone surface that are bisected by an inner generatrix that is equidistant from the forward inner cone surface and the aftward inner cone surface; and
      an outer cone portion adjacent to the inner cone portion, the outer cone portion having a frustoconical shape including a forward outer cone surface opposing an aftward outer cone surface that are bisected by an outer generatrix that is equidistant from the forward outer cone surface and the aftward outer cone surface, wherein the inner generatrix and the outer generatrix are colinear; and
   a mounting flange portion attached to the outer cone for attaching a rotor disk to the compressor hub.

2. The compressor hub of claim 1, wherein the compressor hub is a single component.

3. The compressor hub of claim 1, wherein the cone portion diverges from the sleeve portion at an acute cone angle.

4. The compressor hub of claim 1, and further comprising:
   a seal portion attached to at least one of the cone portion and the sleeve portion.

5. The compressor hub of claim 1, and further comprising:
   a plurality of flow apertures through at least one of the cone portion and the sleeve portion.

6. The compressor hub of claim 1, wherein a first distance between the forward inner cone surface and the aftward inner cone surface is greater than a second distance between the forward outer cone surface and the aftward outer cone surface.

7. A compressor hub comprising:
   a sleeve portion that is cylindrical about a sleeve axis, the sleeve including an inner sleeve surface opposing an outer sleeve surface, the inner sleeve surface having an inner spline and the outer sleeve surface having an outer spline;
   a frustoconical cone portion attached to the sleeve that diverges forward and radially outward; and
   a mounting flange attached to an outer end of the cone portion for attaching a rotor disk to the compressor hub.

8. The compressor hub of claim 7, wherein the compressor hub is a single component.

9. The compressor hub of claim 7, wherein the cone portion diverges from the sleeve portion at an acute cone angle.

10. The compressor hub of claim 7, and further comprising:
    a seal portion attached to at least one of the cone portion and the sleeve portion.

11. The compressor hub of claim 7, and further comprising:
    a plurality of flow apertures through at least one of the cone portion and the sleeve portion.

12. The compressor hub of claim 7, wherein the cone portion is attached to the sleeve portion near the aftward end of the sleeve portion.

13. The compressor hub of claim 7, wherein the inner spline and the outer spline are spaced apart from each other along the sleeve axis such that the inner spline does not overlap the outer spline.

14. The compressor hub of claim 13, wherein the inner spline is aftward of the outer spline.

15. A compressor comprising:
    a single piece compressor hub including:
       a sleeve portion that is cylindrical about a sleeve axis, wherein the sleeve portion of the hub includes an inner sleeve surface opposing an outer sleeve surface, the inner sleeve surface having an inner spline and the outer sleeve surface having an outer spline; and
       a frustoconical cone portion extending from the sleeve portion that diverges forward and radially outward; and
       a mounting flange portion adjacent to an outer end of the cone portion;
    a first rotor disk attached to the mounting flange; and
    a second rotor disk attached to the mounting flange.

16. The compressor of claim 15, and further comprising:
    a third rotor disk attached to the mounting flange.

17. The compressor of claim 15, wherein the mounting flange portion is comprised of a plurality of circumferentially separated tabs that each includes a mounting hole for attaching at least one of the rotor disks.

18. The compressor hub of claim 15, and further comprising:
    a plurality of flow apertures through at least one of the cone portion and the sleeve portion.

19. The compressor of claim 15, wherein the cone portion of the compressor hub comprises:

an inner cone portion adjacent to the sleeve portion, the inner cone portion having a frustoconical shape including a forward inner cone surface opposing an aftward inner cone surface that are bisected by an inner generatrix that is equidistant from the forward inner cone surface and the aftward inner cone surface; and an outer cone portion adjacent to the inner cone portion, the outer cone portion having a frustoconical shape including a forward outer cone surface opposing an aftward outer cone surface that are bisected by an outer generatrix that is equidistant from the forward outer cone surface and the aftward outer cone surface;

wherein the inner generatrix and the outer generatrix are colinear.

20. The compressor of claim 19, wherein the sleeve portion of the hub includes an inner sleeve surface opposing an outer sleeve surface, the inner sleeve surface having an inner spline and the outer sleeve surface having an outer spline.

\* \* \* \* \*